US007969151B2

(12) United States Patent
Bench

(10) Patent No.: US 7,969,151 B2
(45) Date of Patent: Jun. 28, 2011

(54) PRE-AMPLIFIER AND MIXER CIRCUITRY FOR A LOCATOR ANTENNA

(75) Inventor: Stephen M. Bench, Carlsbad, CA (US)

(73) Assignee: SeekTech, Inc., San Diego, CA (US)

( * ) Notice: Subject to any disclaimer, the term of this patent is extended or adjusted under 35 U.S.C. 154(b) by 336 days.

(21) Appl. No.: 12/367,419

(22) Filed: Feb. 6, 2009

(65) Prior Publication Data
US 2009/0201023 A1 Aug. 13, 2009

Related U.S. Application Data

(60) Provisional application No. 61/027,212, filed on Feb. 8, 2008, provisional application No. 61/033,272, filed on Mar. 3, 2008.

(51) Int. Cl.
*G01V 3/08* (2006.01)
*G01R 21/14* (2006.01)
(52) U.S. Cl. ........................ 324/326; 324/105
(58) Field of Classification Search ............... 324/105, 324/326
See application file for complete search history.

(56) References Cited

U.S. PATENT DOCUMENTS

| 4,786,862 A * | 11/1988 | Sieron ......................... 324/126 |
| 5,757,181 A * | 5/1998 | Wolf et al. ............... 324/207.12 |
| 6,531,860 B1 * | 3/2003 | Zhou et al. .................... 324/105 |

* cited by examiner

*Primary Examiner* — Bot L LeDynh
(74) *Attorney, Agent, or Firm* — Steven C. Tietsworth, Esq.

(57) ABSTRACT

A pre-amplifier circuit for connection to an antenna of a human-portable locator includes a differential amplifier/mixer pair and means for allowing a common-mode "phantom" signal to modulate a transfer function of the differential amplifier/mixer pair. The common-mode phantom signal modulates the transfer function of the differential pre-amplifier "onboard" the antenna without the usual requirement for onboard power supply and signal oscillator. This technique uses the same electronic components to provide both pre-amplification and mixing functions, thereby improving circuit performance-to-cost ratio, reducing mixer power consumption, situating the necessary signal oscillator remotely from the mixer, and greatly improving the available system bandwidth by limiting spectral transmission demands to the mixed signal bandwidth alone.

11 Claims, 3 Drawing Sheets

PRE-AMPLIFIER AND MIXER CIRCUITRY FOR A LOCATOR ANTENNA

CROSS-REFERENCES TO RELATED APPLICATION

This application claims the benefit, pursuant to 35 U.S.C.§§119-120, of the filing date of U.S. Provisional Application Ser. No. 61/027,212, entitled "CONDUCTIVE BOBBINS AND MIXING," filed on Feb. 8, 2008, the disclosure of which is hereby entirely incorporated by reference.

This application also claims the benefit, pursuant to 35 U.S.C. §§119-120, of the filing date of U.S. Provisional Application Ser. No. 61/033,272, entitled "PRE-AMPLIFIER AND MIXER CIRCUITRY FOR A LOCATOR ANTENNA," filed on Mar. 3, 2008, the disclosure of which is hereby entirely incorporated by reference.

This application is related by inventorship and subject matter to co-pending U.S. patent application Ser. No. 11/248,539 filed by Mark S. Olsson, et al. on Oct. 12, 2005 and entitled "Reconfigurable Portable Locator Employing Multiple Sensor Array Having Flexible Nested Orthogonal Antennas," the entire disclosure of which is hereby incorporated by reference.

BACKGROUND

1. Field of the Invention

This invention relates to portable locators that sense electromagnetic emissions to thereby locate buried utilities such as pipes and cables.

2. Description of the Related Art

There are many situations where is it desirable to locate buried utilities such as pipes and cables. For example, before starting any new construction that involves excavation, worker safety and project economic concerns require the location and identification of existing underground utilities such as underground power lines, gas lines, phone lines, fiber optic cable conduits, cable television (CATV) cables, sprinkler control wiring, water pipes, sewer pipes, etc., collectively and individually herein referred to as "buried objects."

As used herein, the term "buried objects" includes objects located inside walls, between floors in multi-story buildings or cast into concrete slabs, for example, as well as objects disposed below the surface of the ground. If excavation equipment such as a backhoe hits a high voltage line or a gas line, serious injury and property damage may result. Unintended severing of water mains and sewer lines generally leads to messy and expensive cleanup efforts. The unintended destruction of power and data cables may seriously disrupt the comfort and convenience of residents and bring huge financial costs to business. Therefore man-portable locators have been developed that sense electromagnetic emissions to thereby locate buried utilities such as pipes and cables. This is sometimes referred to as "line tracing." If the buried cables or conductors carry their own electrical signal, they can be traced by detecting the emissions at their appropriate frequency. Often signals with a known frequency are applied to pipes and cables via a transmitter to enhance the ease and accuracy of the line tracing. This can be done with an electrical clip in the case of a pipe, or with an inductive coupler in the case of a shielded conductor. Sometimes sondes are used to trace the location of pipes. These are tiny transmitters that are inserted into a pipe and emit electromagnetic signals at a desired frequency.

Portable utility locators typically carry one or more antennas that are used to detect the electromagnetic signals emitted by buried pipes and cables, and sondes that have been inserted into pipes. The accuracy of portable utility locators is limited by the sensitivity of their antennas. Signal interference caused by capacitance or inductance within the antenna structures causes resonance and interference. Additionally, methods of processing signals detected by antennas in portable utility locators by amplifying them and mixing them, have traditionally suffered from inefficiencies which include vulnerability to radio-frequency interference (RFI) and electromagnetic interference (EMI), and the introduction of undesirable capacitance and inductance.

Accordingly, there is a need to improve the sensitivity of antennas used in human-portable locators while improving their performance in isolating and processing signals of interest, and reducing circuit complexity and cost.

SUMMARY

The present invention provides a circuit useful in a human-portable locator system coupling an antenna to a processing and user interface system. The circuit includes a local low-impedance pre-amplifier disposed approximately to the antenna. A remote power supply is disposed distally from the antenna. A remote oscillator is disposed distally from the antenna and coupled to the remote power supply. A plurality of conductors are coupled between the low-impedance pre-amplifier and the remote oscillator for conducting a common-mode phantom signal.

The foregoing, together with other objects, features and advantages of this invention, can be better appreciated with reference to the following specification, claims and the accompanying drawing.

BRIEF DESCRIPTION OF THE DRAWINGS

For a more complete understanding of this invention, reference is now made to the following detailed description of the embodiments as illustrated in the accompanying drawings, in which like reference designations represent like features throughout the several views and wherein.

DETAILED DESCRIPTION

The present invention provides antenna interface circuitry particularly suited for use with an antenna for detecting electromagnetic fields in a human-portable utility locator such as that disclosed in co-pending U.S. patent application Ser. No. 11/248,539 filed by Mark S. Olsson, et al. on Oct. 12, 2005 and entitled "Reconfigurable Portable Locator Employing Multiple Sensor Array Having Flexible Nested Orthogonal Antennas," the entire disclosure of which is incorporated herein by reference.

In accordance with this invention, a pre-amplifier circuit for connection to an antenna of a man-portable locator includes an amplifier/mixer and circuit that allows a common-mode phantom signal to modulate a transfer function of the amplifier/mixer.

The circuitry of this invention employs the repeatable temperature characteristics of a semiconductor p-n junction in the pre-amplifier to control the temperature dependence of the amplifier/mixer, which opposes the effects of the resistive temperature coefficient of the material in the antenna and thereby eliminates most temperature-dependent errors from the sensor array output signals.

The circuitry of this invention employs modulation that is remotely controlled by a phantom signal that can be turned ON or OFF to cause the system to operate as a pre-amplifier or as a mixer, or as both, without component or power supply duplication. Turning the phantom signal ON or OFF may be interpreted as either applying or not applying said signal at the remote end.

Figure 1:
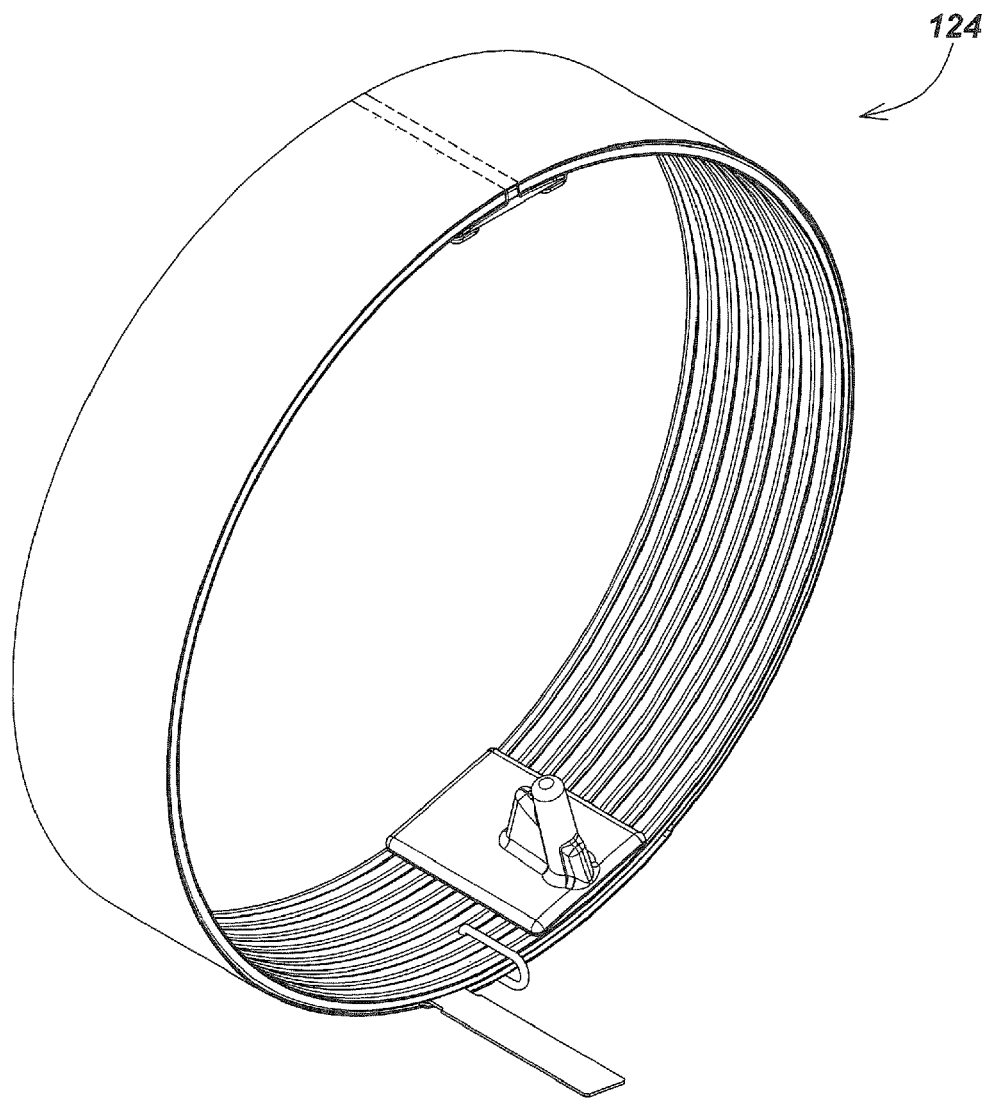
FIG. 1 is a perspective view of an antenna incorporating a conductive bobbin.

A preferred embodiment of the circuitry of this invention includes antenna pre-amplifier and mixer circuitry particularly suited for use with each element of an antenna array employing any number of antennas, such as, for example, three orthogonal antennas each exemplified by the antenna 124 of FIG. 1 and having a generally cylindrical conductive bobbin on which antenna windings are supported to define a sensor axis normal to the winding plane. For example, three of these antennas may be nested in a concentric arrangement so that their respective sensor axes are mutually orthogonal to provide an antenna array for generating signals that represent measured signal strength and field angles in three orthogonal dimensions. The pre-amplifier and mixer circuit of this invention are particularly suited for use with, for example, such an orthogonal antenna array. The present invention also provides a method of modulating the transfer function of each differential pre-amplifier used in signal processing, which, in combination with a common mode phantom signal using a single common oscillator that maybe remotely disposed with respect to the mixer, provides greatly improved system bandwidth and immunity to electromagnetic interference (EMI) and radio frequency interference (RFI). Note that the circuit of this invention is suitable for use with any number of antennas and the discussion of three antennas is merely an exemplary embodiment. An individual common low-impedance pre-amplifier may be used for one or more of the sub-coils in one antenna, and the present exemplary embodiment uses a single common low-impedance pre-amplifier circuit for all sub-coils in each single antenna, requiring three pre-amplifier circuits for the three antennas in the exemplary embodiment. The present invention also provides a method for managing pre-amplifier modulation to improve EMI and RFI immunity in the circuit.

Figure 2:
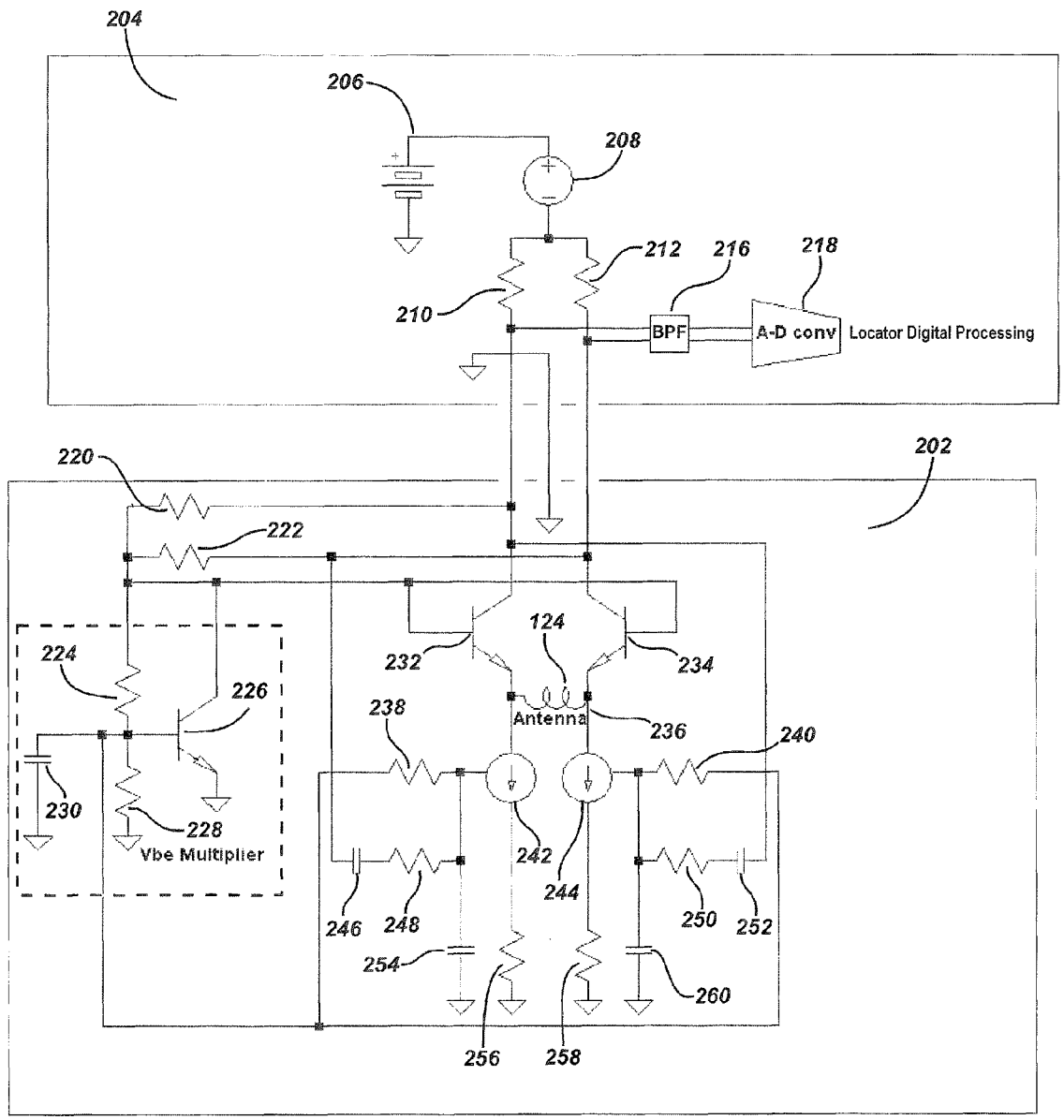
FIG. 2 is a schematic circuit diagram illustrating exemplary embodiments of the pre-amplifier and mixer circuit of this invention suitable for use with the antenna of FIG. 1 in a human-portable utility locator.

FIG. 2 is a schematic circuit diagram illustrating a pre-amplifier and mixer circuit 202 and a processing and user interface system 204 of a human-portable locator employing an antenna array having three antennas (not shown) each exemplified by the antenna 124 (FIG. 1). The processing and user interface system 204 includes a power supply 206 connected to an oscillator 208 that is preferably connected to three substantially identical circuit assemblies (not shown) each exemplified by the pre-amplifier and mixer circuit 202 for antenna 124. The oscillator 208 is advantageously located in the processing and user interface system 204 remote from the antenna 124 and the pre-amplifier and mixer circuit 202. Pre-amplifier load resistors 210 and 212 transfer current from power supply 206 to the pre-amplifier and mixer circuit 202. A bandpass filter 216 passes an analog baseband signal from pre-amplifier and mixer circuit 202 and serves to reject external EMI and RFI interference at the input of an analog-to-digital (A/D) converter 218, which converts the analog baseband signal into a representative digital signal for use by the locator's digital processing circuitry (not shown). It should also be noted that oscillator 208 in FIG. 2 may be externally synchronized to local line frequency so that the line difference frequencies are reduced to simply a DC offset which may be ignored by the locator digital processing, and/or this may be combined with a pilot signal so that the difference frequency is a specific offset from the transmitted frequency and thus may be synchronously detected. Both of these options may be concurrently applied. Note further that while in the preferred embodiment the multiple sub-coils of antenna 124 in FIG. 1 drive a common base low-impedance amplifier, in an alternative configuration a plurality of amplifiers or pre-amplifier circuits may be used.

The analog-to-digital converter is sampled exactly at power-line frequency by using a separate power-line receiver; as a strong interferer, it can be very simple. This receiver can drive a PLL that provides the analog-to-digital converter sampling clock. Note that fixed frequencies close to the power-line frequency may also be employed because sampling at the power-line frequency produces a deep null at the power-line frequency.

Any signal received by the locator system can be mixed to an arbitrary low frequency because the system is adapted to provide mixing that may be applied to all signals. For example, a 32,768 Hz signal that is received may be mixed in the manner described herein with a 32,770 Hz signal to produce a 2 Hz signal that may be detected by the analog-to-digital converter. Thus, in using the locator to trace power lines, for example, the mixing function may be adapted to keep the detection signal frequency lower than one-half the power-line frequency. If the analog-to-digital converter sampling rate is set to the power-line frequency, then the Nyquist Sampling principle demonstrates that no significant detection response can be found at the power-line frequency (there is a response null at the sampling frequency). Thus, sampling at the power line frequency greatly improves locator system performance by making it immune to power-line interference. This method also removes power-line frequency harmonics as well because harmonics near the signal frequency are mixed down to some low frequency near DC and well below one-half of the power-line frequency. Because the bandwidth of the power-line interference signal is not zero, sampling close to the power-line frequency (without locked to the exact power-line frequency) retains most of the benefit of sampling at the exact power-line frequency and offers a significant benefit in the implementation cost and effectiveness of a locating instrument.

As an example of this benefit, consider the need to detect 512 Hz Sonde in the presence of a 60 Hz power-line interferer. The harmonics of 60 Hz in the vicinity of 512 Hz are 480 Hz ($8^{th}$ harmonic) and 540 Hz ($9^{th}$ harmonic). Assume mixing of 512 Hz down to 6 Hz using a 518 Hz mixer signal. Assume desired signal bandwidth to be 4 Hz (510 to 514 Hz), so that the required detector frequency is 4 to 8 Hz. While sampling in the vicinity of the power line frequency (60 Hz), the analog-to-digital converter input is filtered from near DC (but not DC) to near but less than 30 Hz. An input pre-filter of 2 Hz to 18 Hz, for example, eliminates DC and very low frequency noise and 60 Hz aliases from the analog-to-digital converter input While passing the desired signal in the range of 4 to 8 Hz. Note that the direct power-line harmonics of 480 Hz and 540 Hz are also eliminated, assuming any reasonable line noise bandwidth. The mixed-down power-line signal components include, for example, a 540 Hz component mixed down by the 518 Hz mixer signal to 22 Hz and a 480 Hz component similarly mixed down to 38 Hz. Assuming a power line signal bandwidth of 1 Hz, the resulting 21-23 Hz and 37-39 Hz signals are also removed by the exemplary 2 Hz to 18 Hz pre-filter. Note that if the mixer frequency varies slightly, or the line frequency varies slightly, or the Sonde frequency varies slightly, the locator system still operates correctly with these exemplary filter values. Perhaps the strongest interferers in this example are the 60 Hz and 180 Hz power-line components, which are not only relatively distant from the desired signal but are also filtered by the analog-to-digital converter and pre-filter. Even if the sampling occurs at 59 Hz, for example, instead of the precise 60 Hz power-line frequency, the exemplary pre-filter still attenuates the interference by 26 dB, a significant improvement. Also note that removing DC (by using a lower pre-filter frequency of 2 Hz in this example) removes the analog-to-digital conversion effects of any unwanted DC offsets in the pre-amplifier or mixer.

Further in FIG. 2, the pre-amplifier and mixer circuit 202 in this embodiment includes a differential amplifier/mixer transistor pair 232 and 234 each disposed to receive a mixer signal at their respective base from either of bias resistors 220 and 222. Each mixer signal modulates the respective collector-emitter voltage drop in cooperation with the respective one of controlled current sinks 242 and 244. The antenna connection 236 couples the antenna 124 to the differential amplifier/mixer transistor pair 232 and 234. The pair of resistors 224 and 228 with the bias capacitor 230 and transistor 226 together form a bias network functioning as a $V_{be}$ multiplier to provide a constant voltage at the collectors of transistor pair 232 and 234. The bias capacitor 230 provides a steady DC voltage supply to the two lower controlled current sinks 242 and 244 and operates to remove mixer signal components. Resistors 238 and 240 each provide bias injection to regulate a respective one of the two controlled current sinks 242 and 244 and also each complete one of the differential regeneration dividers formed on one side by the resistors 238 and 248 with the capacitors 246 and 254 and on the other side by the resistors 240 and 250 with the capacitors 252 and 260, substantially as shown. In the two differential regeneration dividers, capacitors 246 and 252 each provide DC blocking for regeneration in the respective sub-circuit, while resistors 248 and 250 respectively set regenerative gain and couple with capacitors 246 and 252 to an arbitrary low frequency. Capacitors 254 and 260 each act as the frequency determining point for regeneration in the respective sub-circuit. In combination with impedance characteristics of antenna 124, capacitors 254 and 260 establish a wide, flat response characteristic. Resistors 256 and 258 act as balance resistors for the current sink and establish the ratio of current between the $V_{be}$ multiplier and the current sink. Such ratiometric control facilitates operation of these components as a band-gap regulator, providing inherent temperature compensation and tailoring temperature dependence in the pre-amplifier to exactly compensate for any temperature-related changes in antenna coil resistance, thereby improving system temperature independence.

Figure 3:
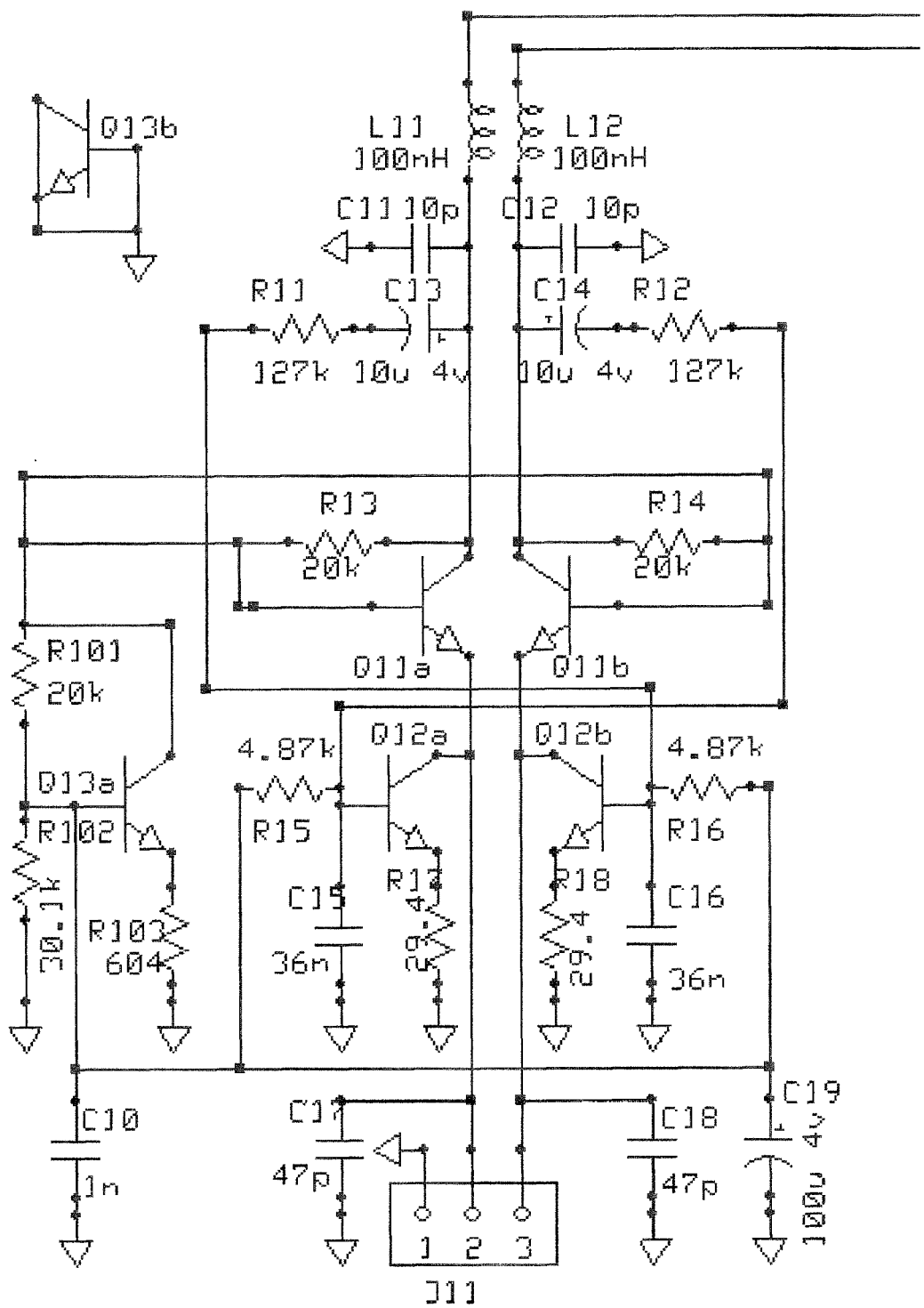
FIG. 3 is a schematic circuit diagram of the pre-amplifier and mixer circuit embodiments of FIG. 2 illustrating exemplary circuit values.

FIG. 3 provides a circuit diagram showing an exemplary embodiment of the components of the pre-amplifier and mixer circuit 202 and their nominal values and may be appreciated with reference to the description of FIG. 2. Note that Q13b, included for completeness, is not used in the illustrated circuit embodiment.

In FIG. 2, the pre-amplifier and mixer circuit 202 associated with each of the antennas exemplified by the antenna 124 performs a mixing method that provides a common-mode phantom signal from oscillator 208 to modulate the transfer function of the differential amplifier/mixer transistor pair 232 and 234. Instead of separating out or seeking to eliminate the modulation effects in the differential amplifier/mixer pair 232 and 234, these modulation effects are intentionally allowed and enhanced. The modulation is remotely controllable by a "phantom" signal ("phantom" in the sense that the signal is introduced remotely at the DC bias connector terminals to the collectors of differential transistor pair 232 and 234), which may be turned ON or OFF to cause the system to operate either as a pre-amplifier or as a mixer. This provides component economy by eliminating separate pre-amplifier and mixer circuits. It further provides power economy by eliminating the power needed to operate mixer circuit components because both pre-amplifier and mixer employ the same electronic components. Thus, the pre-amplifier and mixer circuit 202 receives "phantom" power from a remote power supply and "phantom" modulation from a remote common mode oscillator 208 so that neither need be provided onboard circuit 202. This method has the benefit of improving the bandwidth of the system because the transmission media need only support the differential mixed signal.

Each antenna exemplified by the antenna 124 is preferably terminated directly and locally to a dedicated pre-amplifier and mixer circuit 202 to reduce circuit capacitance. Remote ("phantom") power and modulation (e.g., from system 204) facilitates such localization by eliminating all local power and modulation requirements. Performing mixing and amplification functions locally in the antenna array 200 minimizes unwanted external pickup reduces EFI and RFI susceptibility. Because the signal entering the transmission line between circuit 202 and system 204 is already locally amplified (buffered), the signal-to-noise ratio (SNR) is improved. Further, with local mixing, this phantom method permits filtering to be introduced more effectively, without affecting the system's frequency coverage, because the output frequency spectrum tends to be restricted. In the preferred embodiment, the mixing mode operating in the pre-amplifier and mixer circuit 202 can be a sinusoidal or a switched mode. Other waveforms, such as a complex waveform which sums two or more frequencies may be used to equal advantage. For instance, multiple frequencies might be applied to simultaneously mix several frequencies to a common frequency, or mix several frequencies to several other frequencies, such as may be necessary in spread spectrum applications. Note that spread spectrum and its related applications may also use pseudo-noise signals (PN or quasi-random) instead of conventional sine-wave mixing sources. These and many other useful signal formats are accommodated by the structure described herein. The degree of modulation available during mixing is a function of the varying signal level combined with the fixed or varying oscillator level.

As a further example, the available frequency response characteristic may be extended to lower frequencies through regeneration by providing a controlled positive feedback with a loop gain less than unity. Such feedback lowers effective pre-amplifier circuit impedance, which in turn significantly improves low-frequency (LF) performance, lowering the LF cutoff frequency by as much as 60-dB. Adapting this technique to the circuitry of this invention accommodates a wider frequency range without compromising the antenna performance. The pre-amplifier and mixer circuit 202 can selectively activate regeneration to enhance low-frequency search performance, effectively adding a filtering function at negligible cost and without additional power. Because low frequency enhancement results from a positive controlled feedback, any direct control of the positive feedback by, for example, simply controlling the gain of the amplifier with remotely controlled load impedance (e.g., pre-amplifier load resistors 210 and 212 in FIG. 2) facilitates any desired response characteristic. The combination of regeneration and analog-to-digital converter sampling at power line frequencies is particularly advantageous, providing an improved low frequency performance without the usual limitations imposed by power line harmonics. This feature is particularly useful when locating 16 Hz sondes, for example.

The antenna 124 and the pre-amplifier and mixer circuit 202 together provide tailored temperature dependence in the preamplification to compensate for temperature-induced changes in antenna coil resistance, thereby improving locator accuracy over a significant range of ambient temperatures. This effect arises from employing the repeatable temperature characteristics of the semiconductor p-n junction in the pre-amplification to control the temperature dependence of the differential amplifier/mixer pair 232 and 234, which opposes the effects of the resistive temperature coefficient of the material in the antenna 124. Before these teachings, the antenna material temperature dependence was ignored as an error term, which limited the available system accuracy and utility until now.

In the preferred embodiment of the circuit of this invention, the topology of the pre-amplifier and mixer circuit 202 is disposed to eliminate performance variation responsive to supply voltage changes. This benefit derives from the ratiometric amplification scheme of this invention, which ensures that DC characteristics, and therefore gain, do not fluctuate with supply voltage.

The mixing method of this invention for the first time provides a common-mode "phantom" signal for use in modulating the transfer function of the "onboard" differential pre-amplifier without the usual requirement for onboard power supply and signal generation at the antenna, which increases cost and reduces performance for many well-known reasons: eliminates components by removing the power supply, and local signal generating (oscillator) source, for example. Combining the phantom modulation with phantom signal operation provides for the first time a remotely-controlled phantom signal that allows onboard circuit operation either as a simple pre-amplifier or as a mixer. This technique uses the same electronic components to provide both preamplification and mixing functions, thereby improving circuit performance-to-cost ratio, reducing mixer power consumption, situating the single necessary oscillator remotely from the mixer, facilitating remote "phantom" circuit powering and "phantom" oscillator injection and greatly improving the available system bandwidth by limiting spectral transmission demands to the mixed signal bandwidth alone. Additionally the circuit of this invention substantially eliminates the well-known locator antenna capacitance problem by terminating each antenna element immediately into a dedicated proximal mixer/pre-amplifier circuit. Finally, the circuitry of this invention yields more accurate line tracing performance.

The present invention accomplishes four important functions, namely: 1) mixing and amplifying in the same hardware via remote control; 2) remote controlled regeneration; 3) sampling of an analog-to-digital converter in circuitry connected to the pre-amplifier; and 4) temperature compensation of the antenna via the pre-amplifier. The first and second functions are related by the fact that the load on the pre-amplifier is remote to the pre-amplifier itself. Thus by applying a common mode signal to each of the differential load impedances, the pre-amplifier becomes a mixer. However, the gain of an amplifier is also affected by its load impedance. Therefore, either the first function or the second function can be invoked remotely from the pre-amplifier at the load. The second and third functions are related by low frequency extension. The "better" you make the low frequency response, the "worse" the system performance becomes due to power line signals. These pervade the environment of a man-portable buried utility locator. Therefore, if the circuit can sample the analog-to-digital converter (connected to the pre-amplifier) at the power line frequency, the circuit is more immune to this interference, and can thus the low frequency response of the locator can be extended using controlled regeneration. The circuit can only sample the analog-to-digital converter at the low frequency. Mixing higher frequencies down to a frequency that will pass through the narrow band analog-to-digital converter is therefore advantageous. Thus, the present invention has a triple beneficial effect. The fourth function occurs because the pre-amplifier is now local to the antenna and thus at relatively the same temperature. Since the gain and operation of the pre-amplifier is under control of the common mode DC biasing signal thereby importing the first and second functions, this also allows direct control of temperature compensation as well.

The present invention provides a novel method useful in a man-portable buried utility locator that includes the steps of: receiving at a local pre-amplifier a common-mode phantom signal from a remote processing and user interface system; adjusting a load impedance with the phantom signal to provide positive feedback with a loop-gain less than unity in the local pre-amplifier for the purpose of extending the low-frequency response of the local pre-amplifier; connecting an output signal of the pre-amplifier to an analog-to-digital converter located distally in the remote processing and user interface system; and sampling the analog-to-digital converter located distally in the remote processing and user interface system at a frequency substantially equivalent to a power line frequency for the purpose reducing the interference effects of power line frequency upon the output of the analog-to-digital converter.

Clearly, other embodiments and modifications of this invention may occur readily to those skilled in the art in view of these teachings. Therefore, the protection afforded this invention is to be limited only by the following claims, which include all such embodiments and modifications when viewed in conjunction with the above specification and accompanying drawings.

What is claimed is:

1. In a human-portable locator system, a circuit for coupling an antenna to a processing and user interface system, the circuit comprising:
   a local low-impedance pre-amplifier disposed proximally to the antenna;
   a remote power supply disposed distally from the antenna;
   a remote oscillator disposed distally from the antenna and coupled to the remote power supply; and
   a plurality of conductors coupled between the low-impedance pre-amplifier and the remote oscillator for conducting a common-mode phantom signal.

2. The circuit of claim 1 wherein the local low-impedance pre-amplifier includes a differential pair of transistors, each having a semiconductor junction.

3. The circuit of claim 2 wherein:
   the antenna has a temperature-dependent characteristic; and
   at least one semiconductor junction has a temperature dependent characteristic selected to compensate for at least part of the antenna temperature-dependent characteristic.

4. The circuit of claim 3 wherein:
   the common-mode phantom signal includes a DC voltage for biasing a semiconductor junction in at least one of the local differential pair of transistors.

5. The circuit of claim 2 wherein:
the common-mode phantom signal includes an AC signal for modulating at least one of the local differential pair of transistors.

6. The circuit of claim 1 wherein:
the antenna produces an antenna signal representing dynamic variations in the local electromagnetic field; and
the common-mode phantom signal includes a representation of the antenna signal.

7. In a human-portable locator system, a circuit for coupling a processing and user interface system to an antenna having a temperature-dependent characteristic, the circuit comprising:
a local differential pair of transistors disposed proximally to the antenna, each having a semiconductor junction, at least one semiconductor junction having a temperature dependent characteristic selected to compensate for at least part of the antenna temperature characteristic;
a remote power supply disposed distally from the antenna;
a remote oscillator disposed distally from the antenna and coupled to the remote power supply; and
a plurality of conductors coupled between the local differential pair of transistors and the remote oscillator for conducting a common-mode phantom signal.

8. The circuit of claim 7 wherein:
the common-mode phantom signal includes an AC signal for modulating at least one of the local differential pair of transistors.

9. The circuit of claim 7 wherein:
the antenna produces an antenna signal representing dynamic variations in the local electromagnetic field; and
the common-mode phantom signal includes a representation of the antenna signal.

10. The circuit of claim 7 further comprising:
a remote switching means for interrupting the common-mode phantom signal, whereby operation of the local differential pair of transistors may be changed between pre-amplifier operation and mixer operation.

11. In a human-portable locator system having an antenna and a local low-impedance pre-amplifier disposed proximally to the antenna and coupled through a first load impedance to a remote processing and user interface system, a method for operating the pre-amplifier comprising the steps of:
receiving at the local low-impedance pre-amplifier a common-mode phantom signal from the remote processing and user interface system;
adjusting the first load impedance with the phantom signal to provide positive feedback with a loop gain less than unity in the local low-impedance pre-amplifier to extend the low-frequency response of the local low-impedance pre-amplifier;
connecting an output signal of the low-impedance pre-amplifier to an analog-to-digital converter located distally in the remote processing and user interface system; and
sampling the analog-to-digital converter located distally in the remote processing and user interface system at a frequency substantially equivalent to a power line frequency to reduce interference effects of the power line frequency upon the output signal of the analog-to-digital converter.

* * * * *